(12) United States Patent
Currie (10) Patent No.: US 11,212,381 B2
(45) Date of Patent: Dec. 28, 2021

(54) METHODS AND SYSTEMS FOR SHORT CODE VOICE DIALING

(71) Applicant: Christopher A. Currie, Austin, TX (US)

(72) Inventor: Christopher A. Currie, Austin, TX (US)

(*) Notice: Subject to any disclaimer, the term of this patent is extended or adjusted under 35 U.S.C. 154(b) by 7 days.

(21) Appl. No.: 16/871,850

(22) Filed: May 11, 2020

(65) Prior Publication Data

US 2021/0352171 A1 Nov. 11, 2021

(51) Int. Cl.
*H04M 1/275* (2006.01)
*H04M 7/00* (2006.01)
*H04M 3/533* (2006.01)
*H04M 3/51* (2006.01)

(52) U.S. Cl.
CPC ......... *H04M 1/275* (2013.01); *H04M 3/5166* (2013.01); *H04M 3/53391* (2013.01); *H04M 7/006* (2013.01)

(58) Field of Classification Search
CPC ............... H04M 1/275; H04M 3/5166; H04M 3/53391; H04M 7/006
USPC ....................................................... 455/564
See application file for complete search history.

(56) References Cited

U.S. PATENT DOCUMENTS

| | | | | |
|---|---|---|---|---|
| 6,161,012 | A | 12/2000 | Fenton et al. | |
| 7,630,885 | B1* | 12/2009 | Shen | H04M 1/6041 704/221 |
| 8,107,978 | B2* | 1/2012 | Anderl | H04W 4/12 455/466 |
| 8,676,575 | B2* | 3/2014 | Shen | H04M 1/6041 704/221 |
| 2005/0186970 | A1* | 8/2005 | Yates | H04W 84/08 455/456.5 |
| 2008/0080488 | A1 | 4/2008 | Marsico | |
| 2009/0147778 | A1* | 6/2009 | Wanless | H04M 7/0042 370/389 |
| 2011/0122827 | A1* | 5/2011 | Bjorsell | H04W 76/11 370/328 |
| 2014/0200049 | A1* | 7/2014 | Shen | G10L 19/24 455/563 |

OTHER PUBLICATIONS

Spoke-Interactive, "Voice Short Codes", https://www.spoke-interactive.com/social-tv-radio/voice-short-codes/, printed May 6, 2020, 3 pages.
TxtNation Limited, "Voice Short Codes", https://www.txtnation.com/mobile-billing/voice-short-codes/, printed May 6, 2020, 5 pages.

* cited by examiner

*Primary Examiner* — Ankur Jain
(74) *Attorney, Agent, or Firm* — DLA Piper LLP (US)

(57) ABSTRACT

Embodiments disclosed herein are directed to a method and system of processing a short code voice call request is disclosed herein. A computing system receives a voice call request. The voice call request includes a short code associated with a target recipient. The computing system determines the target recipient based on the short code in the voice call request. The computing system determines preferences of the target recipient for processing the voice call request. The computing system processes the voice call request based on the determined preferences.

20 Claims, 9 Drawing Sheets

METHODS AND SYSTEMS FOR SHORT CODE VOICE DIALING

FIELD OF THE DISCLOSURE

The present disclosure generally relates to a method and a system for supporting voice calls using short codes.

BACKGROUND

Today's companies often leverage short codes for communicating with subscribers or potential subscribers via text based messages, but not for voice calls. Short codes allow a company to reach a consumer or subscriber through shorter and easier to remember sequences of digits compared to conventional ten-digit phone numbers. Further, through the use of short codes, companies can better track consumer engagement based on subscriber rate, click rate, conversion rate, and the like.

SUMMARY

In some embodiments, a method of processing a short code voice call request is disclosed herein. A computing system receives a voice call request. The voice call request includes a short code associated with a target recipient, ... . The computing system determines the target recipient based on the short code in the voice call request. The computing system determines preferences of the target recipient for processing the voice call request. The computing system processes the voice call request based on the determined preferences.

In some embodiments, a non-transitory computer readable medium is disclosed herein. The non-transitory computer readable medium has one or more instructions that, when executed by a computing system, causes the computing system to perform one or more operations. The one or more operations include receiving, by a computing system, a voice call request. The voice call request includes a short code associated with a target recipient. The one or more operations further include determining, by the computing system, the target recipient based on the short code in the voice call request. The one or more operations further include determining, by the computing system, preferences of the target recipient for processing the voice call request. The one or more operations further include processing, by the computing system, the voice call request based on the determined preferences.

In some embodiments, a system is disclosed herein. The system includes a processor and a memory. The memory has programming instructions stored thereon, which, when executed by the processor, performs one or more operations. The one or more operations include receiving a voice call request. The voice call request includes a short code associated with a target recipient. The one or more operations further include determining the target recipient based on the short code in the voice call request. The one or more operations further include determining preferences of the target recipient for processing the voice call request. The one or more operations further include processing the voice call request based on the determined preferences.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein allow for companies or subscribers to communicate with customers or potential customers using a short code for voice dialing and receiving in-bound voice calls from short code numbers. Conventional telecommunication systems were simply unable to support the receipt of voice calls dialed via short code numbers. For example, when a user attempted to dial a short code (e.g., a phone number having less digits than the traditional E.164 format), the user's telecommunication service would receive the dial request and return an error to the user. As such, companies or subscribers have simply been unable to extend the benefits of short code messaging to voice dialing due to the limitations of conventional telecommunication systems.

The one or more techniques described herein provide an improvement over conventional systems by including a management system configured specifically for handling and processing short code voice call requests. In some embodiments, management system may be an independent entity from one or more telecommunication services. In some embodiments, management system may be a module implemented by a telecommunication service.

Traditional telecommunications carrier (including wireless and landline carriers) systems are architected to process only those voice-based calls that satisfy the E.164 standard for how telephone addresses are formed. Further, short code numbers are architected by traditional telecommunications carriers only to process only text messages. Voice calling using short code numbers is not supported by existing telecommunication infrastructure.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
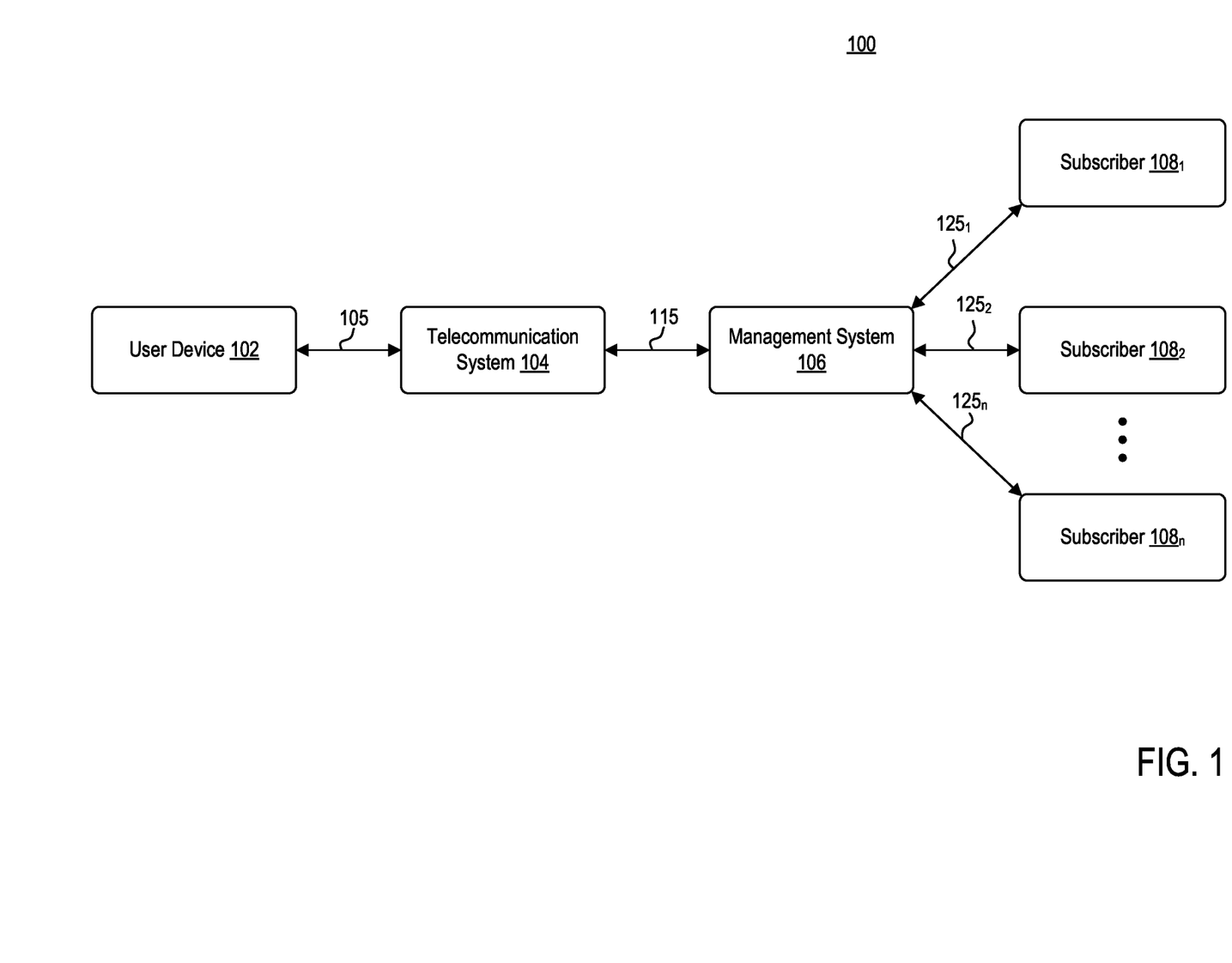
FIG. 1 is a block diagram illustrating an exemplary telecommunication environment, according to example embodiments.

FIG. 1 is a block diagram illustrating a telecommunication environment 100, according to some embodiments. Telecommunication environment 100 may include a user device 102, a telecommunication system 104, a management system 106, and one or more subscribers $108_1$-$108_a$ (generally "subscriber 108").

User device 102 may be operated by one or more users. For example, user device 102 may be representative of a land line, a mobile device, a tablet, a desktop computer, or any system having the capabilities described herein. Generally, user device 102 may be configured to initiate a voice call to a recipient and/or receive a voice call from an initiator. As illustrated, user device 102 may communicate with telecommunication system 104 via one or more communication channels 105.

Telecommunication system 104 may be representative of one or more computing systems associated with a telecommunication system 104. Telecommunication system 104 may be configured to provide voice and messaging services to multiple clients, such as, but not limited to, user device 102. Generally, upon receiving a voice call request and/or message request from user device 102, telecommunication system 104 may be configured to forward the voice call request and/or message request to the desired recipient. Telecommunication system 104 may identify the desired recipient based on the number (or address) provided by the user.

Conventionally, telecommunication system 104 was limited to processing voice call requests based on E.164 number format. E.164 number formal is a numbering plan that ensures each device has a globally unique number. Telecommunication system 104 now, however, may be configured to receive voice call requests based on numbers not compliant with the E.164 number format. For example, telecommunication system 104 may be configured to receive voice call requests based on numbers associated with a short code. A short code may refer to a number that includes less digits than the standard E.164 format. In some embodiments, a short code may refer to a number between and including at least three digits and up to nine digits in length.

Telecommunication system 104 may be configured to communicate with management system 106 via one or more communication channels 115. Management system 106 may be representative of one or more communicating systems associated with a management organization. Management system 106 may be configured to process short code dial requests transmitted by telecommunication system 104. For example, in operation, upon receiving a voice call request based on a short code, telecommunication system 104 may forward the request to management system 106. Management system 106 may forward the short code voice call request to the intended recipient.

Management system 106 may be configured to communicate with each subscriber 108 via one or more communication channels $125_1$-$125_a$ (generally, "communication channel 125"). Each subscriber 108 may be representative of an entity or organization that has registered a short code with management system 106. In some embodiments, subscriber 108 may pay a monthly fee to management system 106 to use a short code for voice call requests. In operation, upon receiving a voice call request via telecommunication system 104, management system 106 may identify a subscriber 108 corresponding to the received short code. Based on identifying subscriber 108, management system 106 may forward the request to subscriber 108.

Figure 2:
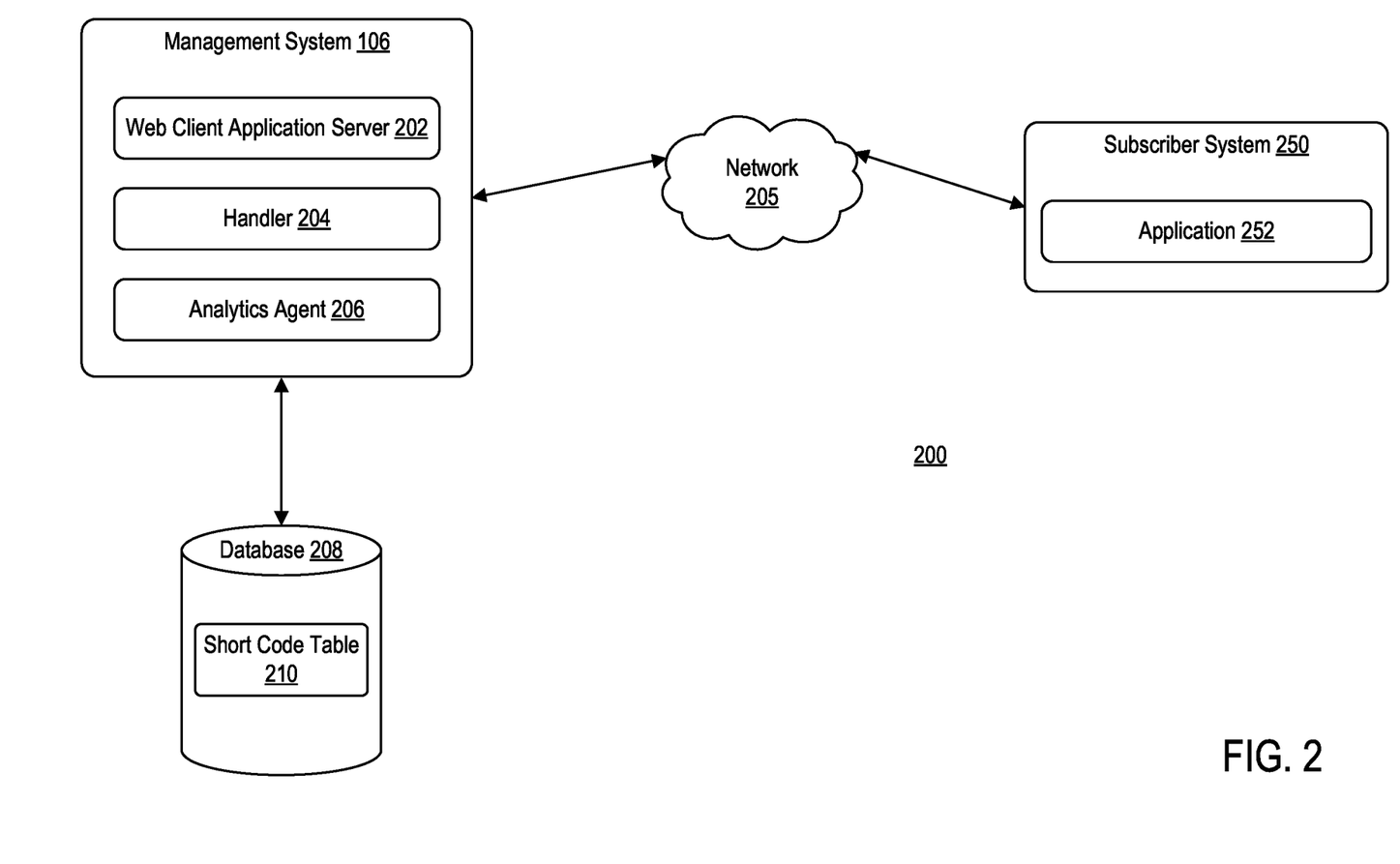
FIG. 2 is block diagram illustrating components a computing environment, according to example embodiments.

FIG. 2 is a block diagram illustrating a computing environment 200, according to example embodiments. Computing environment 200 may include management system 106, subscriber system 250, and database 208. Management system 106 may communicate with subscriber system 250 via network 205.

Network 205 may be of any suitable type, including individual connections via the Internet, such as cellular or Wi-Fi networks. In some embodiments, network 205 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 205 may include any type of computer networking arrangement used to exchange data or information. For example, network 205 may be the Internet, a private data network, virtual private network using a public network and/or other suitable connection(s) that enables components in computing environment 200 to send and receiving information between the components of computing environment 200.

Management system 106 may include web client application server 202, handler 204, and analytics agent 206. Handler 204 and analytics agent 206 may be comprised of one or more software modules. The one or more software modules are collections of code or instructions stored on a media (e.g., memory of management system 106) that represent a series of machine instructions (e.g., program code) that implements one or more algorithmic steps. Such machine instructions may be the actual computer code the processor of management system 106 interprets to implement the instructions, or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Handler 204 may be configured to receive and process short code voice call requests forwarded from telecommunication system 104. Handler 204 may be configured to communicate with database 208. Database 208 may include short code table 210. Short code table 210 may be representative of a list of short codes and their corresponding owners or subscribers. For example, short code table 210 may include short code "222333" corresponding to Subscriber $108_1$; short code "111234" corresponding to Subscriber $108_2$; and "4545" corresponding to Subscriber $108_3$; etc. In some embodiments, short code table 210 may further include an address corresponding to a respective subscriber.

In operation, upon receiving a voice call request from telecommunication system 104, handler 204 may query database 208 to determine a subscriber corresponding to the short code. Handler 204 may be configured to forward the voice call request to subscriber system, based on the subscriber information stored in database 208.

Analytics agent 206 may be configured to manage analytics associated with each short code registered with management system 106. For example, analytics agent 206 may be configured to track a conversion rate for each short code. In some embodiments, tracking the conversion rate for each short code may include tracking a number of voice call requests made to each short code. In some embodiments, tracking the conversion rate for each short code may include tracking a number of text message requests made to each short code. In some embodiments, tracking the conversion rate for each short code may include tracking a number of voice call requests and text message requests made to each short code.

Subscriber system 250 may be operated by a user. For example, subscriber system 250 may be representative of one or more mobile devices, tablets, desktop computers, or any computing systems having the capabilities described herein. Users may include, but are not limited to, individuals such as, for example, subscribers, clients, prospective clients, or customers of an entity associated with management system 106, such as individuals who have obtained, will obtain, or may obtain a product, service, or consultation from an entity associated with management system 106.

Subscriber system 250 may include at least application 252. Application 252 may be representative of a web browser that allows access to a website or a stand-alone application. Subscriber system 250 may access application 252 to access functionality of management system 104. Subscriber system 250 may communicate over network 205 to request a webpage, for example, from web client application server 202 of management system 106. For example, subscriber system 250 may be configured to execute application 252 to access content managed by web client application server 202, such as, but not limited to analytics information associated with subscriber system's 250 short code. The content that is displayed to subscriber system 250 may be transmitted from web client application server 202 to subscriber system 250 and subsequently processed by application 252 for display through a graphical user interface (GUI) of subscriber system 250.

Figure 3:
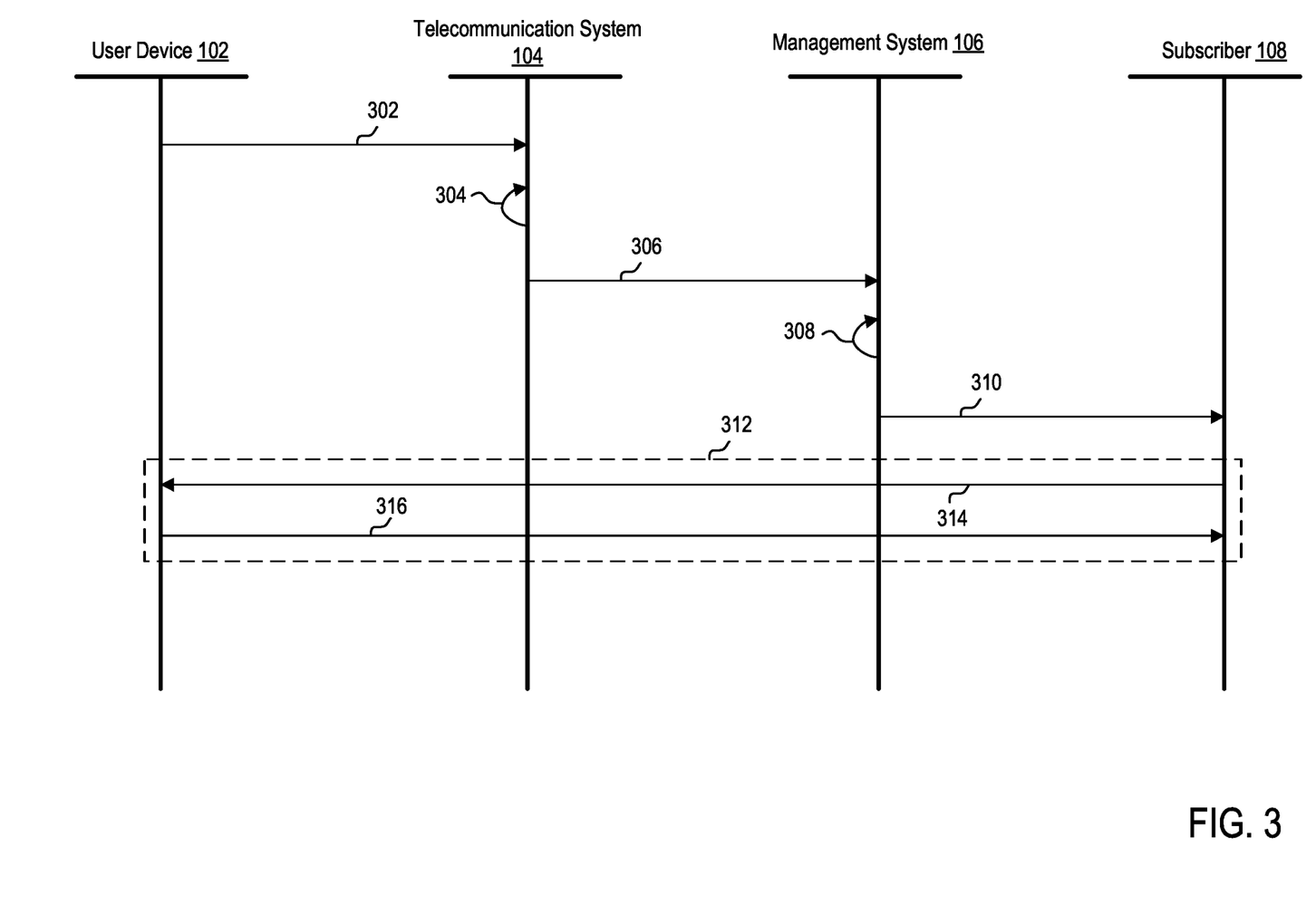
FIG. 3 is a block diagram illustrating communications among components of a telecommunication environment, according to example embodiments.

FIG. 3 is block diagram illustrating communications among components of telecommunication environment 100, according to example embodiments. At block 302, user device 102 may transmit a voice call request to telecommunication system 104. In some embodiments, voice call request may include a number of an intended recipient of the voice call request. In some embodiments, the number of the intended recipient may be a short code (i.e., between and including at least three digits and up to nine digits in length).

At block 304, telecommunication system 104 may receive the voice call request from user device 102. telecommunication system 104 may handle the voice call request to determine how to process the voice call request. In some embodiments, if telecommunication system 104 determines that the number is compliant with E.164 standards, telecommunication system 104 may process the voice call request accordingly. In some embodiments, if telecommunication system 104 determines that the number is not compliant with E.164 standards, telecommunication system 104 may determine whether the number is in a format with a valid short code number. If telecommunication system 104 determines that the number is in a format compatible with valid short code number, at block 306 telecommunication system 104 may forward the voice call request to management system 106. If, however, telecommunication system 104 determines that the number is not compliant with E.164 standards and is not compliant with a valid short code number format, telecommunication system 104 may reject the voice call request from user device 102.

At block 308, management system 106 may receive the voice call request from telecommunication system. In some embodiments, management system 106 may verify that the short code number is valid. For example, handler 204 of management system 106 may query database 208 to determine whether the short code number is valid. In some embodiments, management system 106 may further verify that the short code number is active for text messaging (e.g., short message service (SMS), multimedia message service (MMS), and the like). In some embodiments, management system 106 may query database 208 to determine how to forward the voice call request, based on subscriber information. For example, management system 106 may determine that the voice call request should be forwarded to a voice over internet protocol (VoIP) session initiation protocol (SIP) uniform resource identifier (URI) (i.e., VoIP SIP URI). In another example, management system 106 may determine that the voice call request should be forwarded to a traditional telephone number associated with subscriber system 250. In another example, management system 106 may determine that the voice call request should be processed directly with an interactive voice response service, by playing a non-interactive voice media recording, and the like. In another example, management system 106 may determine that the voice call request should be processed by playing an interactive voice media recording, such as an interactive voice response, allowing the voice call initiator to select from a variety of choices.

At block 310, management system 106 may transmit the voice call request based on the query. For example, assuming that management system 106 is to forward the voice call request to a traditional telephone number associated with subscriber system 250, management system 106 may forward the voice call request to subscriber system 250. In some embodiments, management system 106 may connect to a subscriber system 250 via session initiation protocol (SIP), voice over internet protocol (VoIP), and the like. In some embodiments, management system 106 may call forward to a telephone number over a public switched telephone network (PSTN). In some embodiments, at block 312, management system 106 may further facilitate a connection between user device 102 and subscriber 108. For example, management system 106 may facilitate a connection between user device 102 and subscriber 108, such that user device 102 may communicate directly with subscriber 108 and vice versa (e.g., blocks 314, 316).

Figure 4:
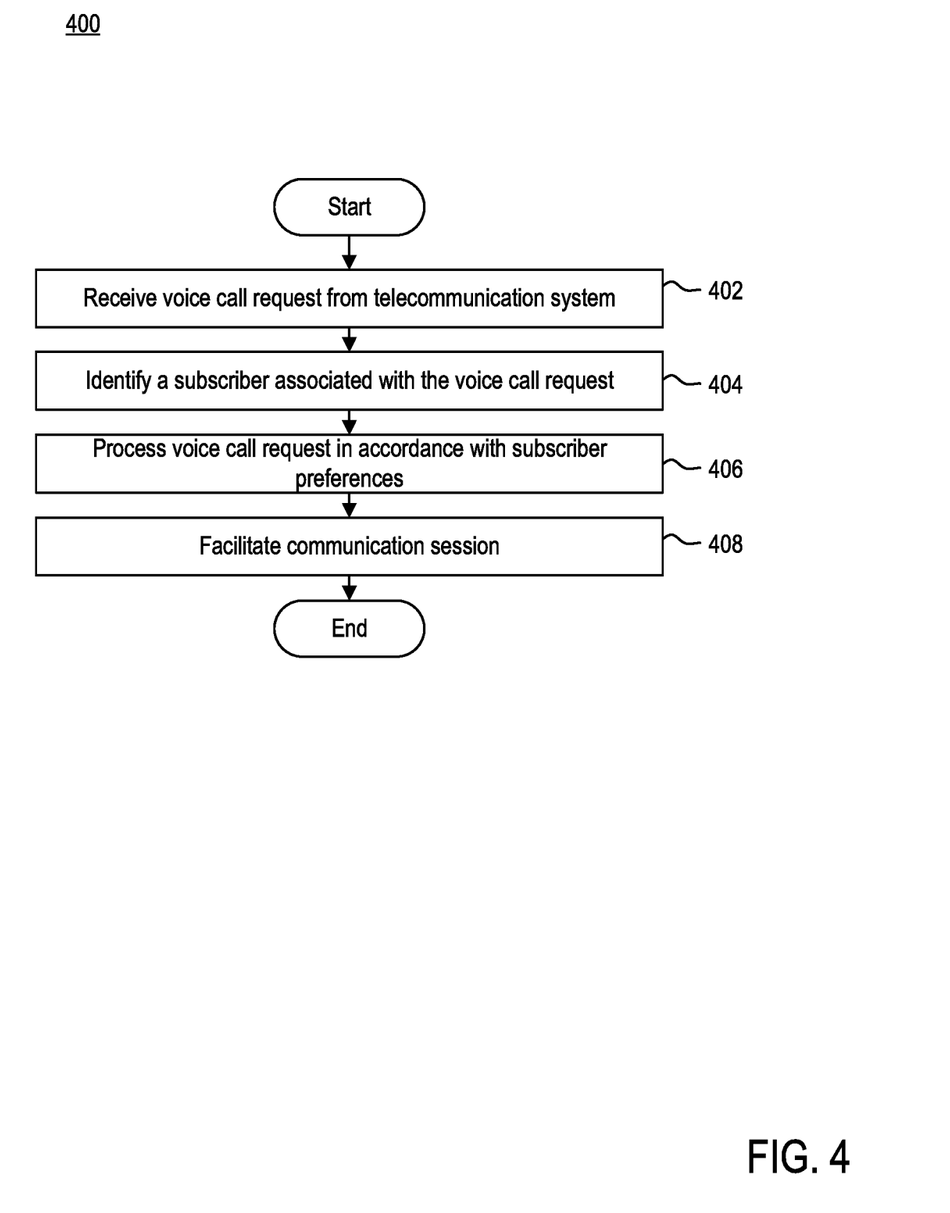
FIG. 4 is a flow diagram illustrating a method of processing a short code voice call request, according to example embodiments.

FIG. 4 is a flow diagram illustrating a method 400 of processing a short code voice call request, according to example embodiments. Method 400 may begin at step 402.

At step 402, management system 106 may receive a voice call request from telecommunication system 104. The voice call request may be responsive to telecommunication system 104 receiving a short code voice call request from user device 102. In some embodiments, the voice call request may include a short code associated with the voice call request. In some embodiments, the voice call request may be between and include at least three digits and up to nine digits in length At step 404, management system 106 may identify a subscriber associated with the short code voice call request. For example, handler 204 may query database 208 to determine a subscriber associated with the short code. Generally, database 208 may include short code table 210. Short code table 210 may be representative of a list of short codes and their corresponding owners or subscribers. In some embodiments, short code table 210 may further include an address corresponding to a respective subscriber.

At step 406, management system 106 may process the voice call request in accordance with subscriber preferences. In some embodiments, management system 106 may query database 208 to determine how to process the voice call request, based on subscriber information. For example, management system 106 may determine that the voice call request should be forwarded to a VoIP SIP URI. In another example, management system 106 may determine that the voice call request should be forwarded to a traditional telephone number associated with subscriber system 250. In another example, management system 106 may determine that the voice call request should be processed directly with an interactive voice response service, by playing a non-interactive voice media recording, and the like.

At step 408, management system 106 may facilitate a communication session. Management system 106 may facilitate the communication session in accordance with the identified process. For example, management system 106 may facilitate a communication session between user device 102 and subscriber 108.

In some embodiments, once the communication session begins between a subscriber 108 and user device 102, subscriber 108 and/or user device 102 may play non-interactive media. In some embodiments, once the communication session begins, subscriber 108 and/or user device 102 may play interactive media. In some embodiments, once the communication session begins, subscriber 108 and/or user device 102 may record the voice call. In some embodiments, once the communication session begins, subscriber 108 and/or user device 102 may take some other action or create an event based on the occurrence of the voice call or based on content within the voice call, without the call taking any specific action.

Figure 5:
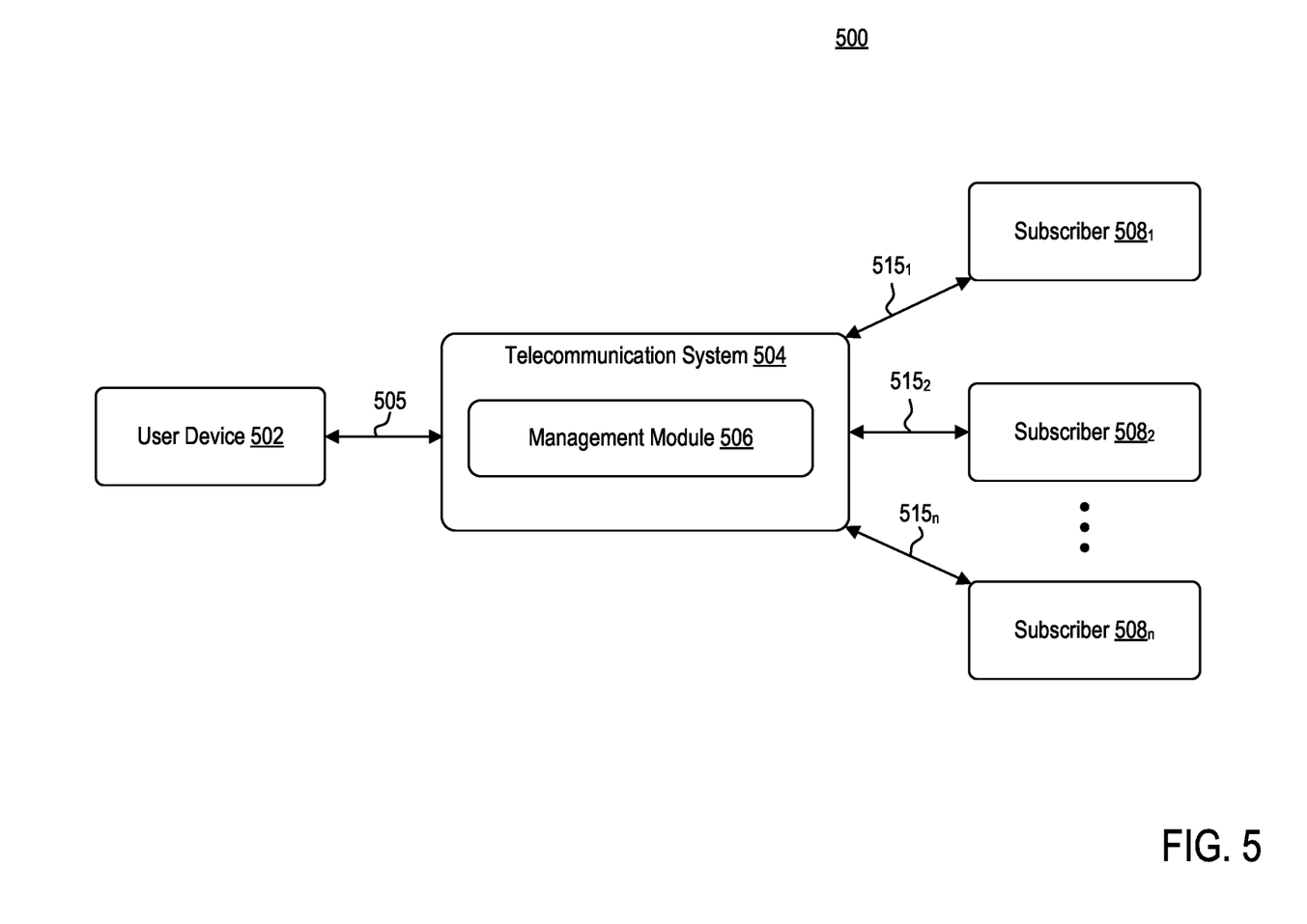
FIG. 5 is a block diagram illustrating an exemplary telecommunication environment, according to example embodiments.

FIG. 5 is a block diagram illustrating a telecommunication environment 500, according to some embodiments. Telecommunication environment 500 may be similar to telecommunication environment 100. For example, as shown, telecommunication environment 500 may include a user device 502, a telecommunication system 504, and one or more subscribers $508_1$-$508_n$ (generally "subscriber 508").

User device 502 may be similar to user device 102. User device 502 may be operated by one or more users. For example, user device 502 may be representative of a land line, a mobile device, a tablet, a desktop computer, or any system having the capabilities described herein. Generally, user device 502 may be configured to initiate a voice call to a recipient and/or receive a voice call from an originator. As illustrated, user device 502 may communicate with telecommunication system 504 via one or more communication channels 505.

Telecommunication system 504 may be similar to telecommunication system 104. Telecommunication system 504 may be representative of one or more computing systems associated with a telecommunication system. Telecommunication system 504 may be configured to provide voice and messaging services to multiple clients, such as, but not limited to, user device 502. Generally, upon receiving a voice call request and/or message request from user device 502, telecommunication system 504 may be configured to forward the voice call request and/or message request to the desired recipient. Telecommunication system 504 may identify the desired recipient based on the number (or address) provided by the user.

Telecommunication system 504 may include management module 506. Management module 506 may be similar to management system 106 in telecommunication environment 100. For example, management module 506 may be composed of the same components as management system 106 (e.g., handler components recited in FIG. 2). Management module 506 may be representative of one or more communicating systems associated with a management organization. Management module 506 may be configured to process short code dial requests received by telecommunication system 504. For example, in operation, upon receiving a voice call request based on a short code, telecommunication system 504 may process the short code voice call request using management module 506. Management module 506 may forward the short code voice call request to the intended recipient.

Management module 506 may be configured to communicate with each subscriber 508 via one or more communication channels $515_1$-$515_a$ (generally, "communication channel 515"). Each subscriber 508 may be representative of an entity or organization that has registered a short code with telecommunication system 504. In some embodiments, subscriber 508 may pay a monthly fee to telecommunication system 504 to use a short code for voice call requests. In operation, management module 506 may identify a subscriber 508 corresponding to the received short code. Based on identifying subscriber 508, management module 506 may forward the request to subscriber 508.

Figure 6:
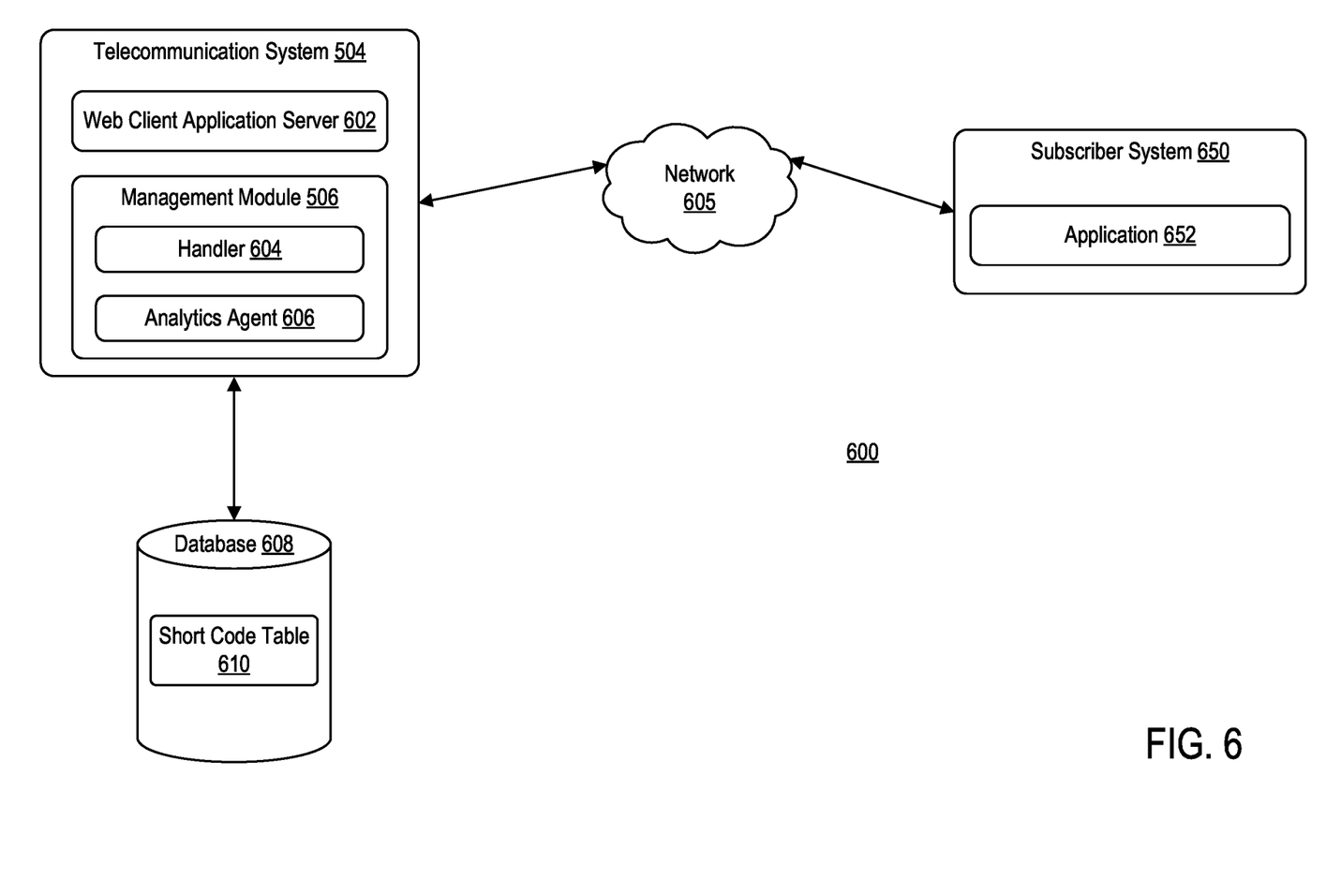
FIG. 6 is block diagram illustrating components a computing environment, according to example embodiments.

FIG. 6 is a block diagram illustrating a computing environment 600, according to example embodiments. Computing environment 600 may include telecommunication system 504, subscriber system 650, and database 608. Telecommunication system 504 may communicate with subscriber system 650 via network 605.

Network 605 may be of any suitable type, including individual connections via the Internet, such as cellular or Wi-Fi networks. In some embodiments, network 605 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 605 may include any type of computer networking arrangement used to exchange data or information. For example, network 605 may be the Internet, a private data network, virtual private network using a public network and/or other suitable connection(s) that enables components in computing environment 600 to send and receiving information between the components of computing environment 600.

Telecommunication system 504 may include web client application server 202 and management module 506. Management module 506 may include handler 604 and analytics agent 606. Management module 506, handler 604, and analytics agent 606 may be comprised of one or more software modules. The one or more software modules are collections of code or instructions stored on a media (e.g., memory of telecommunication system 504) that represent a series of machine instructions (e.g., program code) that implements one or more algorithmic steps. Such machine instructions may be the actual computer code the processor of telecommunication system 504 interprets to implement the instructions, or, alternatively, may be a higher level coding of the instructions that is interpreted to obtain the actual computer code. The one or more software modules may also include one or more hardware components. One or more aspects of an example algorithm may be performed by the hardware components (e.g., circuitry) itself, rather as a result of an instruction.

Handler 604 may be configured to receive and process short code voice call requests forwarded from telecommunication system 104. Handler 604 may be configured to communicate with database 608. Database 608 may include short code table 610. Short code table 610 may be representative of a list of short codes and their corresponding owners or subscribers. In some embodiments, short code table 610 may further include an address corresponding to a respective subscriber. In operation, upon receiving a voice call request from telecommunication system 504, handler 604 may query database 608 to determine a subscriber corresponding to the short code. Handler 604 may be configured to forward the voice call request to subscriber system, based on the subscriber information stored in database 608.

Analytics agent 606 may be configured to manage analytics associated with each short code registered with telecommunication system 504. For example, analytics agent 606 may be configured to track a conversion rate for each short code. In some embodiments, tracking the conversion rate for each short code may include tracking a number of voice call requests made to each short code. In some embodiments, tracking the conversion rate for each short code may include tracking a number of text message requests made to each short code. In some embodiments, tracking the conversion rate for each short code may include tracking a number of voice call requests and text message requests made to each short code.

Subscriber system 650 may be operated by a user. For example, subscriber system 650 may be representative of one or more mobile devices, tablets, desktop computers, or any computing systems having the capabilities described herein. Users may include, but are not limited to, individuals such as, for example, subscribers, clients, prospective clients, or customers of an entity associated with management system 106, such as individuals who have obtained, will obtain, or may obtain a product, service, or consultation from an entity associated with management system 106.

Subscriber system 650 may include at least application 652. Application 652 may be representative of a web browser that allows access to a website or a stand-alone application. Subscriber system 650 may access application 652 to access functionality of telecommunication system 504. Subscriber system 650 may communicate over network 505 to request a webpage, for example, from web client application server 602 of telecommunication system 504. For example, subscriber system 650 may be configured to execute application 652 to access content managed by web client application server 602, such as, but not limited to analytics information associated with subscriber system's 650 short code. The content that is displayed to subscriber system 650 may be transmitted from web client application server 602 to subscriber system 650 and subsequently processed by application 652 for display through a graphical user interface (GUI) of subscriber system 650.

Figure 7:
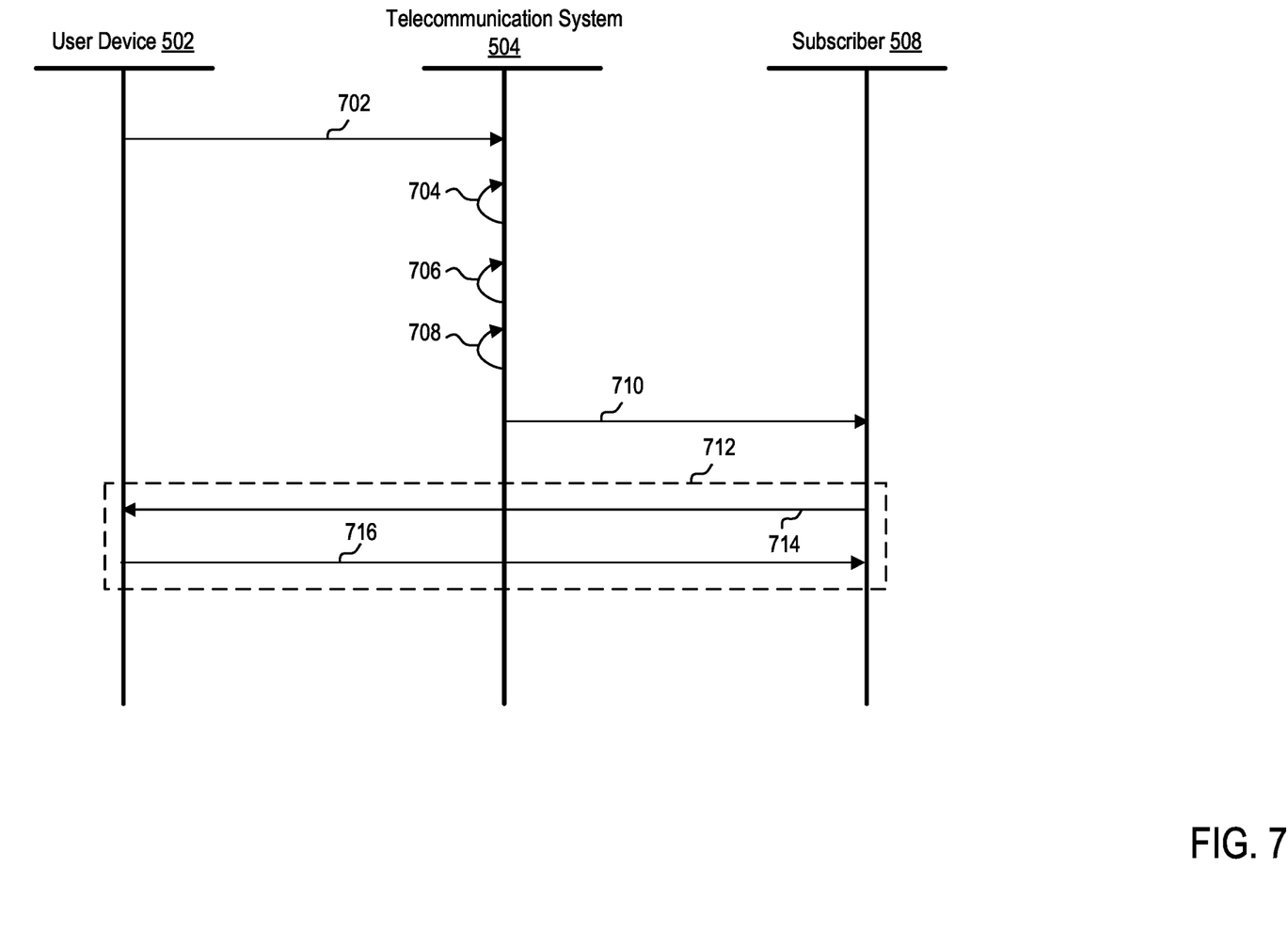
FIG. 7 is a block diagram illustrating communications among components of a telecommunication environment, according to example embodiments.

FIG. 7 is block diagram illustrating communications among components of telecommunication environment 500, according to example embodiments. At block 702, user device 502 may transmit a voice call request to telecommunication system 504. In some embodiments, voice call request may include a number of an intended recipient of the voice call request. In some embodiments, the number of the intended recipient may be a short code (i.e., between and including at least three digits and up to nine digits in length).

At block 704, telecommunication system 504 may receive the voice call request from user device 502. telecommunication system 504 may handle the voice call request to determine how to process the voice call request. In some embodiments, if telecommunication system 504 determines that the number is compliant with E.164 standards, telecommunication system 504 may process the voice call request accordingly. In some embodiments, if telecommunication system 504 determines that the number is not compliant with E.164 standards, telecommunication system 504 may determine whether the number is in a format with a valid short code number. If telecommunication system 504 determines that the number is in a format compatible with valid short code number, at block 706 telecommunication system 504 may prompt management module 506 to handle the request. If, however, telecommunication system 504 determines that the number is not compliant with E.164 standards and is not compliant with a valid short code number format, telecommunication system 504 may reject the voice call request from user device 502.

At block 708, management module 506 may receive the voice call request from telecommunication system 504. In some embodiments, management module 506 may verify that the short code number is valid. For example, handler 604 of management module 506 may query database 608 to determine whether the short code number is valid. In some embodiments, management module 506 may further verify that the short code number is active for text messaging (e.g., short message service (SMS), multimedia message service (MMS), and the like). In some embodiments, management module 506 may query database 608 to determine how to forward the voice call request, based on subscriber information. For example, management module 506 may determine that the voice call request should be forwarded to a voice over internet protocol (VoIP) session initiation protocol (SIP) uniform resource identifier (URI) (i.e., VoIP SIP URI). In another example, management module 506 may determine that the voice call request should be forwarded to a traditional telephone number associated with a subscriber system. In another example, management module 506 may determine that the voice call request should be processed directly with an interactive voice response service, by playing a non-interactive voice media recording, and the like.

At block 710, telecommunication system 504 may transmit the voice call request based on the query. For example, assuming that management module 506 determines that the voice call request is to be forwarded to a traditional telephone number associated with a subscriber system, telecommunication system 104 may forward the voice call request to subscriber 508. In some embodiments, at block 712, telecommunication system 504 may further facilitate a connection between user device 502 and subscriber 508. For example, telecommunication system 504 may facilitate a connection between user device 502 and subscriber 508, such that user device 502 may communicate directly with subscriber 508 and vice versa (e.g., blocks 714, 716).

Figure 8:
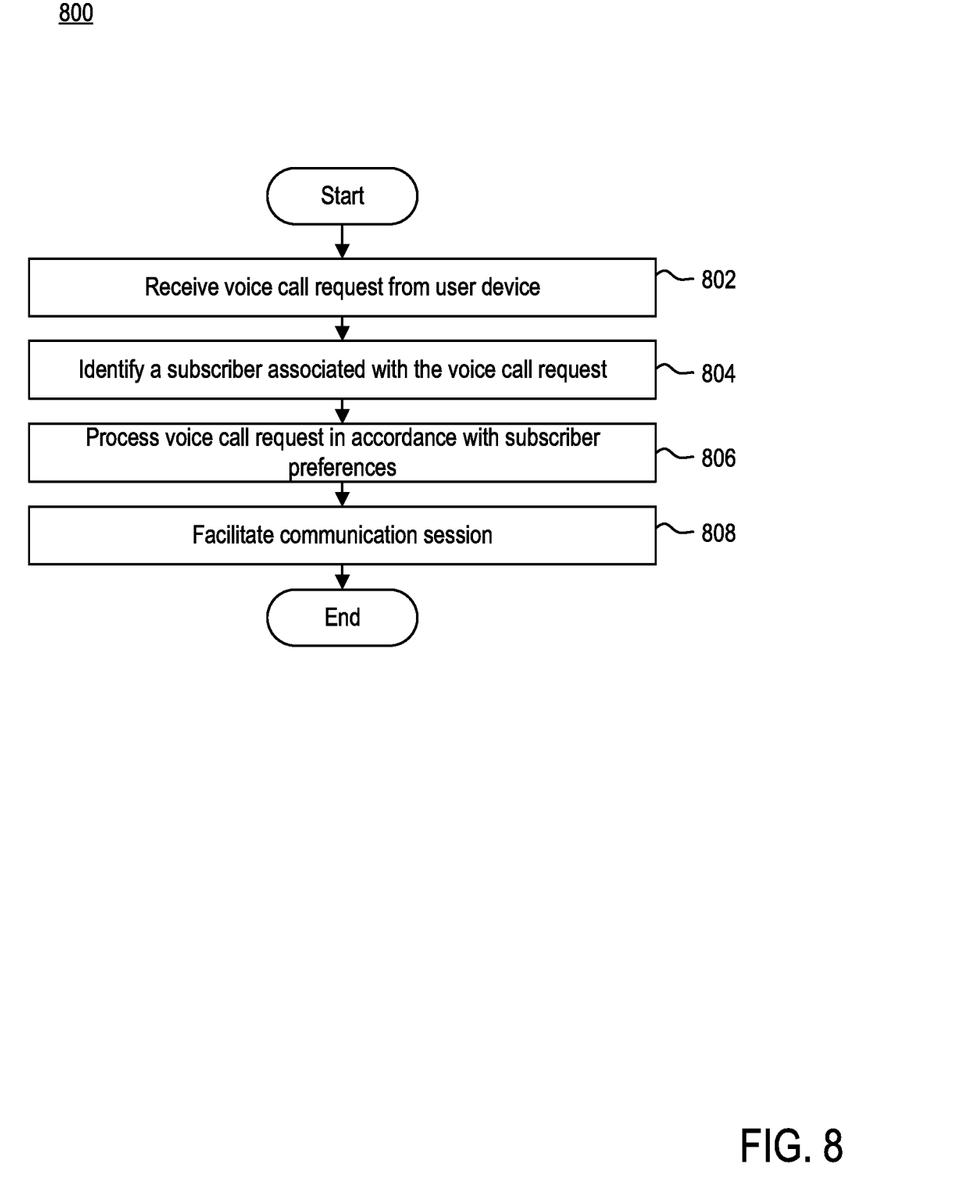
FIG. 8 is a flow diagram illustrating a method of processing a short code voice call request, according to example embodiments.

FIG. 8 is a flow diagram illustrating a method 800 of processing a short code voice call request, according to example embodiments. Method 800 may begin at step 802.

At step 802, telecommunication system 504 may receive a voice call request from user device 502. In some embodiments, the voice call request may include a short code associated with the voice call request. In some embodiments, a number associated with the voice call request may between and including at least three digits and up to nine digits in length.

At step 804, telecommunication system 504 may identify a subscriber associated with the short code voice call request. For example, handler 604 of management module 506 may query database 608 to determine a subscriber associated with the short code. Generally, database 608 may include short code table 610. Short code table 610 may be representative of a list of short codes and their corresponding owners or subscribers. In some embodiments, short code table 610 may further include an address corresponding to a respective subscriber.

At step 806, telecommunication system 504 may process the voice call request in accordance with subscriber preferences. In some embodiments, management module 506 may query database 608 to determine how to process the voice call request, based on subscriber information. For example, management module 506 may determine that the voice call request should be forwarded to a VoIP SIP URI. In another example, management module 506 may determine that the voice call request should be forwarded to a traditional telephone number associated with subscriber system 650. In another example, management module 506 may determine that the voice call request should be processed directly with an interactive voice response service, by playing a non-interactive voice media recording, and the like.

At step 808, telecommunication system 504 may facilitate a communication session. Management module 506 may facilitate the communication session in accordance with the identified process. For example, management module 506 may facilitate a communication session between user device 502 and subscriber 508.

In some embodiments, once the communication session begins, subscriber 508 and/or user device 502 may play non-interactive media. In some embodiments, once the communication session begins, subscriber 508 and/or user device 502 may play interactive media. In some embodiments, once the communication session begins, subscriber 508 and/or user device 502 may record the voice call. In some embodiments, once the communication session begins, subscriber 508 and/or user device 502 may take some other action or create an event based on the occurrence of the voice call or based on content within the voice call, without the call taking any specific action.

Figure 9A:
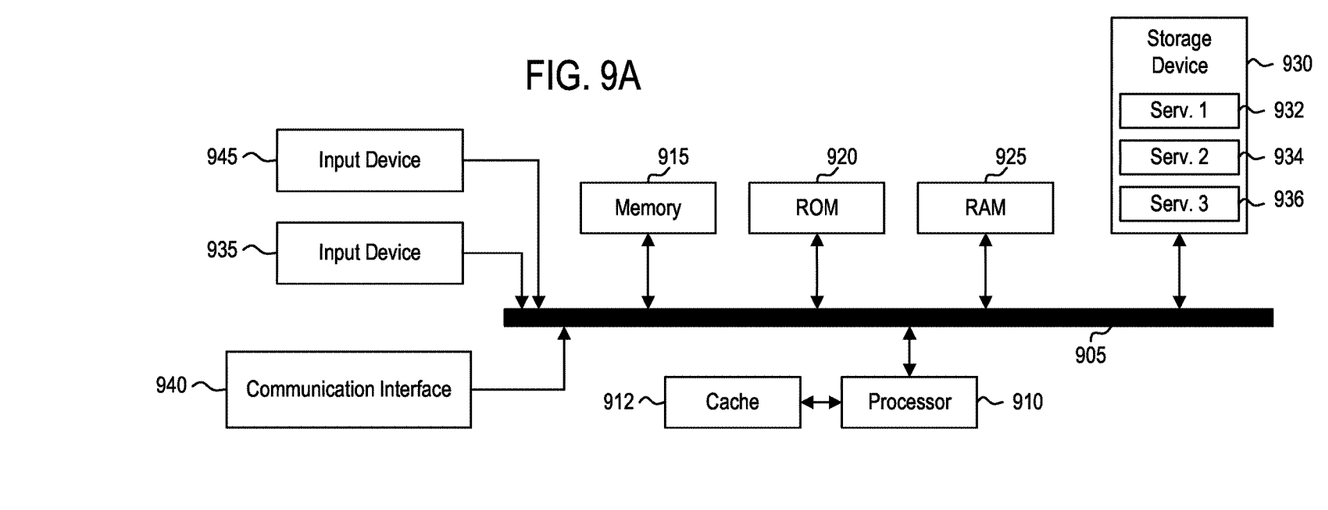
FIG. 9A illustrates a system bus imaging system architecture, according to example embodiments.

FIG. 9A illustrates a system bus imaging system architecture (generally, "system") 900, according to example embodiments. System 900 may be representative of a telecommunication system, a subscriber device, and/or a management system capable of performing the functions described above. One or more components of system 900 may be in electrical communication with each other using a bus 905. System 900 may include a processing unit (CPU or processor) 910 and a system bus 905 that couples various system components including the system memory 915, such as read only memory (ROM) 920 and random access memory (RAM) 925, to processor 910. System 900 may include a cache of high-speed memory connected directly with, in close proximity to, or integrated as part of processor 910. System 900 may copy data from memory 915 and/or storage device 930 to cache 912 for quick access by processor 910. In this way, cache 912 may provide a performance boost that avoids processor 910 delays while waiting for data. These and other modules may control or be configured to control processor 910 to perform various actions. Other system memory 915 may be available for use as well. Memory 915 may include multiple different types of memory with different performance characteristics. Processor 910 may include any general purpose processor and a hardware module or software module, such as service 1 932, service 2 934, and service 3 936 stored in storage device 930, configured to control processor 910 as well as a special-purpose processor where software instructions are incorporated into the actual processor design. Processor 910 may essentially be a completely self-contained system, containing multiple cores or processors, a bus, memory controller, cache, etc. A multi-core processor may be symmetric or asymmetric.

To enable user interaction with the system 900, an input device 945 may represent any number of input mechanisms, such as a microphone for speech, a touch-sensitive screen for gesture or graphical input, keyboard, mouse, motion input, speech and so forth. An output device 935 may also be one or more of a number of output mechanisms known to those of skill in the art. In some instances, multimodal systems may enable a user to provide multiple types of input to communicate with system 900. Communications interface 940 may generally govern and manage the user input and system output. There is no restriction on operating on any particular hardware arrangement and therefore the basic features here may easily be substituted for improved hardware or firmware arrangements as they are developed.

Storage device 930 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 925, read only memory (ROM) 920, and hybrids thereof.

Storage device 930 may include services 932, 934, and 936 for controlling the processor 910. Other hardware or software modules are contemplated. Storage device 930 may be connected to system bus 905. In one aspect, a hardware module that performs a particular function may include the software component stored in a computer-readable medium in connection with the necessary hardware components, such as processor 910, bus 905, display 935, and so forth, to carry out the function.

Figure 9B:
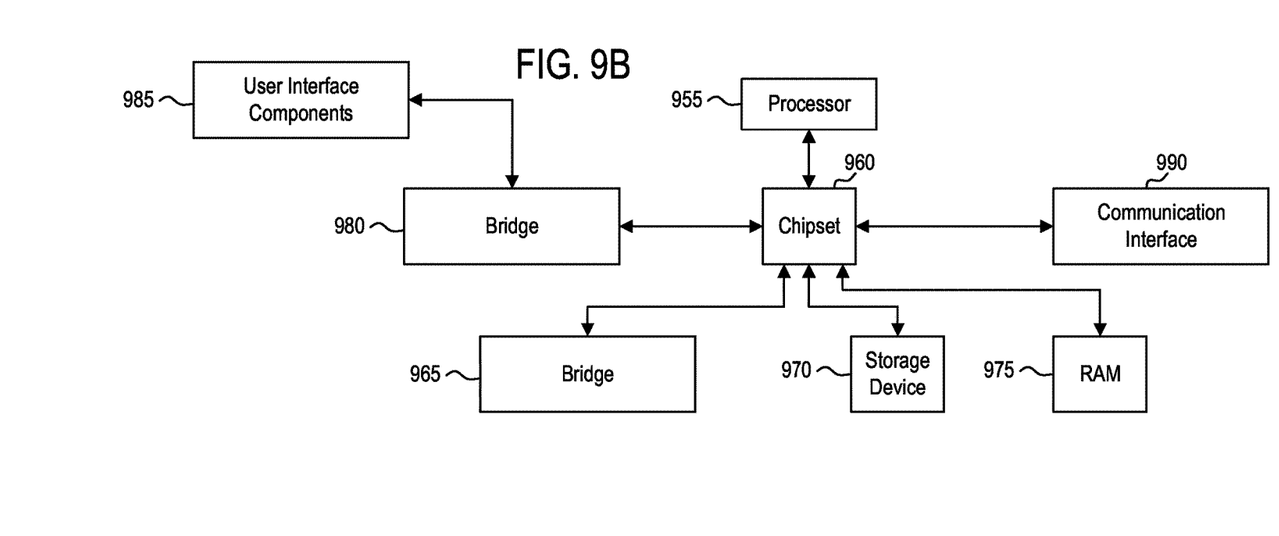
FIG. 9B illustrates a computer system having a chipset architecture, according to example embodiments.

FIG. 9B illustrates a computer system 950 having a chipset architecture. Computer system 950 may be an example of computer hardware, software, and firmware that may be used to implement the disclosed technology. System 950 may include a processor 955, representative of any number of physically and/or logically distinct resources capable of executing software, firmware, and hardware configured to perform identified computations. Processor 955 may communicate with a chipset 960 that may control input to and output from processor 955. In this example, chipset 960 outputs information to output 965, such as a display, and may read and write information to storage device 970, which may include magnetic media, and solid state media, for example. Chipset 960 may also read data from and write data to RAM 975. A bridge 980 for interfacing with a variety of user interface components 985 may be provided for interfacing with chipset 960. Such user interface components 985 may include a keyboard, a microphone, touch detection and processing circuitry, a pointing device, such as a mouse, and so on. In general, inputs to system 950 may come from any of a variety of sources, machine generated and/or human generated.

Chipset 960 may also interface with one or more communication interfaces 990 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 955 analyzing data stored in storage 970 or 975. Further, the machine may receive inputs from a user through user interface components 985 and execute appropriate functions, such as browsing functions by interpreting these inputs using processor 955.

It may be appreciated that example systems 900 and 950 may have more than one processor 910 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. Some embodiments described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of processing a short code voice call request, comprising:
   receiving, by a computing system from a telecommunication system, a voice call request comprising a short code associated with a target recipient, wherein the voice call request originated from a user device and wherein the voice call request is not compliant with the telecommunication system;
   determining, by the computing system, the target recipient based on the short code in the voice call request;
   determining, by the computing system, preferences of the target recipient for processing the voice call request, wherein the preferences define a type of communication channel for handling the voice call request; and
   processing, by the computing system, the voice call request by forwarding the voice call request to the target recipient in accordance with the type of communication channel defined in the preferences.

2. The method of claim 1, wherein determining, by the computing system, the target recipient based on the short code in the voice call request, comprises:
   querying a short code table to determine the target recipient subscribed to the short code.

3. The method of claim 1, wherein determining, by the computing system, preferences of the target recipient for processing the voice call request, comprises:
   determining that the voice call request is to be forwarded to a voice over internet protocol session initiation protocol uniform resource identifier.

4. The method of claim 1, wherein determining, by the computing system, preferences of the target recipient for processing the voice call request, comprises:
   determining that the voice call request is to be forwarded to a traditional phone number associated with the target recipient.

5. The method of claim 1, wherein determining, by the computing system, preferences of the target recipient for processing the voice call request, comprises:
   determining that the voice call request is to be processed directly with an interactive voice response service.

6. The method of claim 1, wherein determining, by the computing system, preferences of the target recipient for processing the voice call request, comprises:
   determining that the voice call request is to be processed directly by playing a non-interactive voice media recording.

7. The method of claim 1, wherein receiving, by the computing system, the voice call request comprising the short code associated with the target recipient, comprises:
   receiving the voice call request forwarded from a telecommunication service.

8. A non-transitory computer readable medium having one or more instructions that, when executed by a computing system, causes the computing system to perform one or more operations comprising:
   receiving, by a computing system from a telecommunication system, a voice call request comprising a short code associated with a target recipient, wherein the voice call request originated from a user device and wherein the voice call request is not compliant with the telecommunication system;
   determining, by the computing system, the target recipient based on the short code in the voice call request;
   determining, by the computing system, preferences of the target recipient for processing the voice call request, wherein the preferences define a type of communication channel for handling the voice call request; and
   processing, by the computing system, the voice call request by forwarding the voice call request to the target recipient in accordance with the type of communication channel defined in the preferences.

9. The non-transitory computer readable medium of claim 8, wherein determining, by the computing system, the target recipient based on the short code in the voice call request, comprises:
   querying a short code table to determine the target recipient subscribed to the short code.

10. The non-transitory computer readable medium of claim 8, wherein determining, by the computing system, preferences of the target recipient for processing the voice call request, comprises:
    determining that the voice call request is to be forwarded to a voice over internet protocol session initiation protocol uniform resource identifier.

11. The non-transitory computer readable medium of claim 8, wherein determining, by the computing system, preferences of the target recipient for processing the voice call request, comprises:
    determining that the voice call request is to be forwarded to a traditional phone number associated with the target recipient.

12. The non-transitory computer readable medium of claim 8, wherein determining, by the computing system, preferences of the target recipient for processing the voice call request, comprises:
    determining that the voice call request is to be processed directly with an interactive voice response service.

13. The non-transitory computer readable medium of claim 8, wherein determining, by the computing system, preferences of the target recipient for processing the voice call request, comprises:
    determining that the voice call request is to be processed directly by playing a non-interactive voice media recording.

14. The non-transitory computer readable medium of claim 8, wherein receiving, by the computing system, the voice call request comprising the short code associated with the target recipient, comprises:
    receiving the voice call request forwarded from a telecommunication service.

15. A system, comprising:
    a processor; and
    a memory having programming instructions stored thereon, which, when executed by the processor, performs one or more operations, comprising:
        receiving, from a telecommunication system, a voice call request comprising a short code associated with a target recipient, wherein the voice call request originated from a user device and wherein the voice call request is not compliant with the telecommunication system;
        determining the target recipient based on the short code in the voice call request;
        determining preferences of the target recipient for processing the voice call request, wherein the preferences define a type of communication channel for handling the voice call request; and
        processing the voice call request based on the determined preferences by forwarding the voice call request to the target recipient in accordance with the type of communication channel defined in the preferences.

16. The system of claim 15, wherein determining preferences of the target recipient for processing the voice call request, comprises:
    determining that the voice call request is to be forwarded to a voice over internet protocol session initiation protocol uniform resource identifier.

17. The system of claim 15, wherein determining preferences of the target recipient for processing the voice call request, comprises:
    determining that the voice call request is to be forwarded to a traditional phone number associated with the target recipient.

18. The system of claim 15, wherein determining preferences of the target recipient for processing the voice call request, comprises:
    determining that the voice call request is to be processed directly with an interactive voice response service.

19. The system of claim 15, wherein determining preferences of the target recipient for processing the voice call request, comprises:
    determining that the voice call request is to be processed directly by playing a non-interactive voice media recording.

20. The system of claim 15, wherein receiving the voice call request comprising the short code associated with the target recipient, comprises:
    receiving the voice call request forwarded from a telecommunication service.

* * * * *